H. M. STRAWN.
SPRING WHEEL.
APPLICATION FILED MAY 25, 1911.
1,030,688.
Patented June 25, 1912.
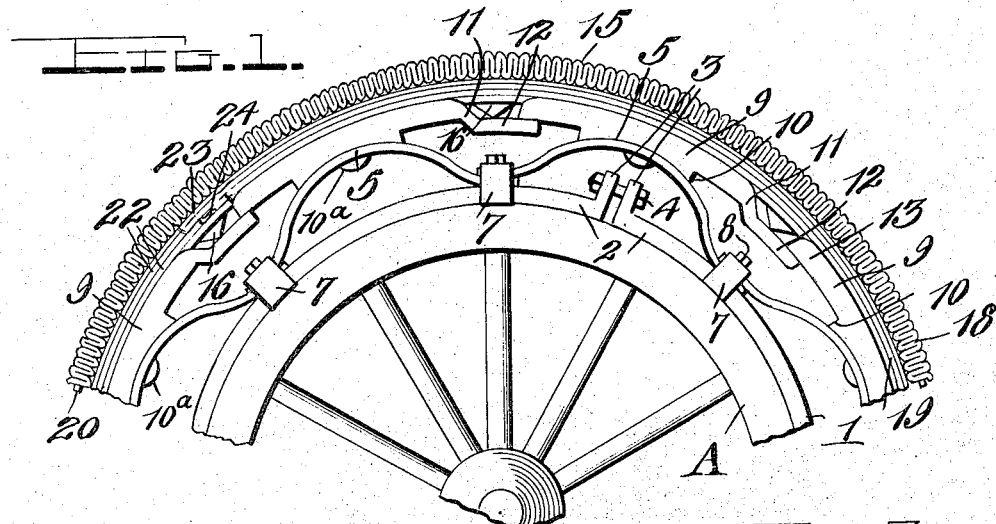
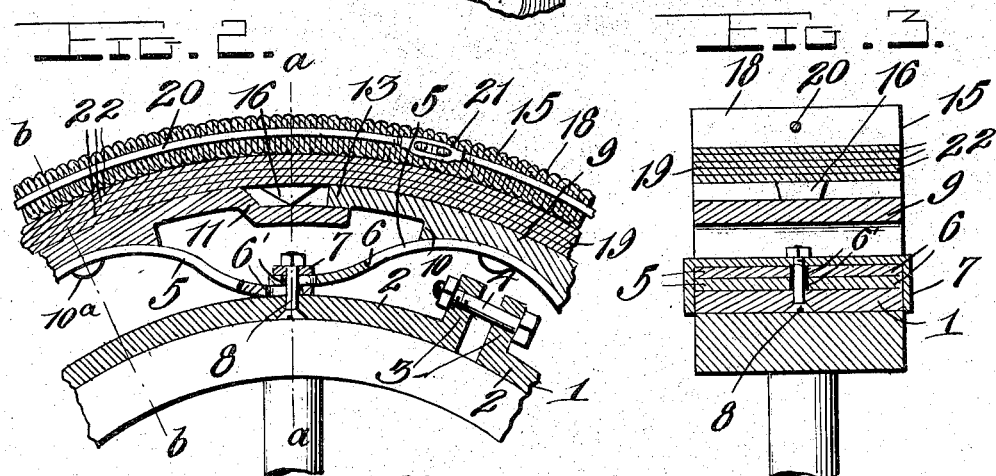
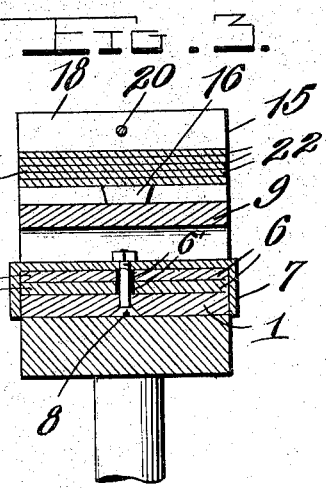
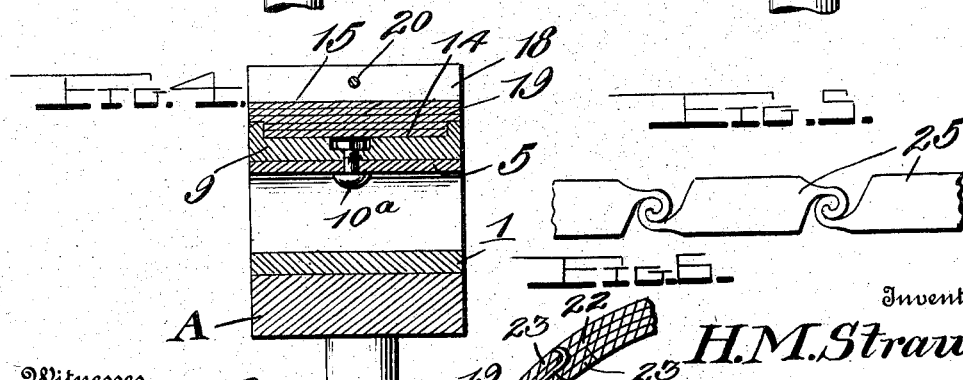
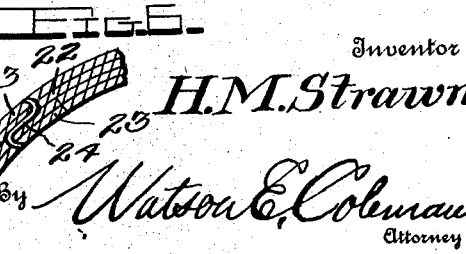
Inventor
H. M. Strawn,
By Watson E. Coleman,
Attorney
Witnesses

UNITED STATES PATENT OFFICE.

HERMAN M. STRAWN, OF MARYSVILLE, CALIFORNIA.

SPRING-WHEEL.

1,030,688.  Specification of Letters Patent.  Patented June 25, 1912.

Application filed May 25, 1911. Serial No. 629,379.

*To all whom it may concern:*

Be it known that I, HERMAN M. STRAWN, a citizen of the United States, residing at Marysville, in the county of Yuba and State of California, have invented certain new and useful Improvements in Spring-Wheels, of which the following is a specification, reference being had to the accompanying drawings.

This invention is an improved spring wheel for use on automobiles and other vehicles to cause the same to ride easily and smoothly without the necessity of employing rubber tires such as are now commonly used, the invention consisting in the construction, combination and arrangement of devices, hereinafter described and claimed.

The object of the invention is to provide an improved spring rim for use on an ordinary automobile wheel, and comprising an attaching band, springs carried by the band and segment shoes carried by the springs, which segment shoes carry the tire, and are capable of radial movement together with the said springs so that the tire of the wheel is rendered exceedingly elastic, as well as strong and durable.

In the accompanying drawings—Figure 1 is a side elevation of a portion of an automobile wheel provided with my improved spring rim and tire. Fig. 2 is a detail sectional view showing a portion of my improved spring rim, and also a portion of the tire thereon, and on a larger scale. Fig. 3 is a detail transverse sectional view of the same on the plane indicated by the line *a—a* of Fig. 2. Fig. 4 is a similar view on the plane indicated by the line *b—b* of Fig. 2. Fig. 5 is a detail plan of a chain armor which may be used as a modified form of the outer tire member. Fig. 6 is a detail sectional view showing the overlapping ends of the inner tire member and the hook coupling which secures the overlapping ends together.

The wheel of an automobile is indicated at A in Fig. 1. In accordance with my invention, I provide an attaching band 1, which comprises two or more segments 2, of steel or iron having out-turned lugs 3 at their ends, the ends of said segments being connected together and the band being tightened and secured and held on the periphery of the wheel by means of bolts 4, which extend through openings in the said lugs. It will be understood that by loosening the said bolts, said attaching band together with the other parts of my improved spring rim and tire may be readily removed from the wheel. Arched springs 5 are carried by the band 1 and disposed on the periphery thereof. The said springs have their meeting ends 6 extended and curved concentrically with the wheel, and disposed in overlapping relation, one end of each spring being disposed on the outer side of one end of the next adjacent spring. The overlapping ends of the spring 5 are provided with longitudinal slots 6'. U-shaped clip yokes 7 have their intermediate portions disposed over the overlapping ends of the springs and their end portions bearing against the outer sides of the said springs and also of the band 1, and the said overlapping ends of the springs together with the said clip yokes are secured to the said band by means of bolts 8, which pass through the slots 6' of the spring ends and also through openings with which the clip yokes are provided. Hence the overlapping ends of the springs are disposed in sliding relation so that the circle formed by the series of springs around the entire circumference of the band may be enlarged or contracted to correspond with the adjustment of the band on the wheel, as will be understood.

On the outer side of the springs 5 are shoes 9, which are segmental in form and are longitudinally curved each of the said shoes having on its inner side at its center, an off-set 10 having a concave inner face which forms a seat for the reception of the central portion of one of the springs, the said springs being secured to the shoes by means of suitable bolts 10ª or other suitable devices. Each shoe 9 is provided at one end with an inwardly extending off-set 11 and with an arm 12 which projects therefrom longitudinally of the shoe. The opposite end 13 of each shoe bears on the arm 12 of the next adjacent shoe so that the shoes are slidably connected together for longitudinal movement to enable the circle formed by the series of shoes to be contracted or enlarged, as may be required by the action of the springs in placing the spring rim on, or removing the same from a wheel. The outer side of each shoe 9 is provided with an outwardly opening longitudinal channel 14. The tire 15 is placed in the said channel of each of the said shoes, and the tire is provided on its inner side with stop bridges 16 which are triangular in shape cross sectionally, and present inwardly extending points which bear on the arms 12 of the shoe at points between the shoulders formed by the off-sets 11, and ends 13 of the shoes, the said stop bridges effectually preventing the tire from "crawling" on the shoes, and around the wheel.

My improved tire comprises an outer member 18 and an inner member 19. The outer member comprises radially disposed layers of fabric such as canvas strips formed with selvage edges, the said strips being plaited or folded to form the said radial layers, as shown, and being also provided with eyeleted openings at points corresponding with the centers of the said raidal layers for the reception of a securing wire hoop or ring 20, which passes through the said openings, and secures the said radial layers in compact form, in contact one with another throughout the series from end to end of the tire, the ends of the said wire hoop 20 being secured together by a suitable coupling such as is indicated at 21.

The inner member 19 of the tire is composed of a series of concentrically disposed layers of canvas strips or strips of other suitable fabric, indicated at 22. The bridge stops 16 are secured to the inner side of the inner member of the tire and the said inner member of the tire is here shown as provided with overlapping ends 23, which are secured together by a suitable hook coupling 24.

If preferred, a sprocket chain armor 25, such as shown in detail in Fig. 5, may be used as the outer member of the tire in lieu of the outer member 20.

I claim:—

1. A wheel of the class described, in combination with a rim member, springs thereon, segment shoes carried by the said springs and disposed with their ends in overlapping relation, each segment shoe having a longitudinal channel in its outer side, and also having an offset portion at one end, and a tire fitted in the channels of the said shoes and having inwardly extending stop devices engaging the offset portions of said shoes.

2. In combination with a rim element of a wheel, springs on said rim element, segment shoes carried by the said springs and each provided at one end with an inwardly extending offset and a longitudinal arm projecting from said off-set, the opposite end of each shoe bearing on the said arm of the next adjacent shoe so that the shoes are disposed with their ends in overlapping relation and slidably connected together, a tire on the said shoes, and stop devices with which the said tire is provided, said stop devices bearing on the arms of the said shoes.

In testimony whereof I hereunto affix my signature in the presence of two witnesses.

HERMAN M. STRAWN.

Witnesses:
W. O. WOOD,
G. W. JORY.